Figure 1:
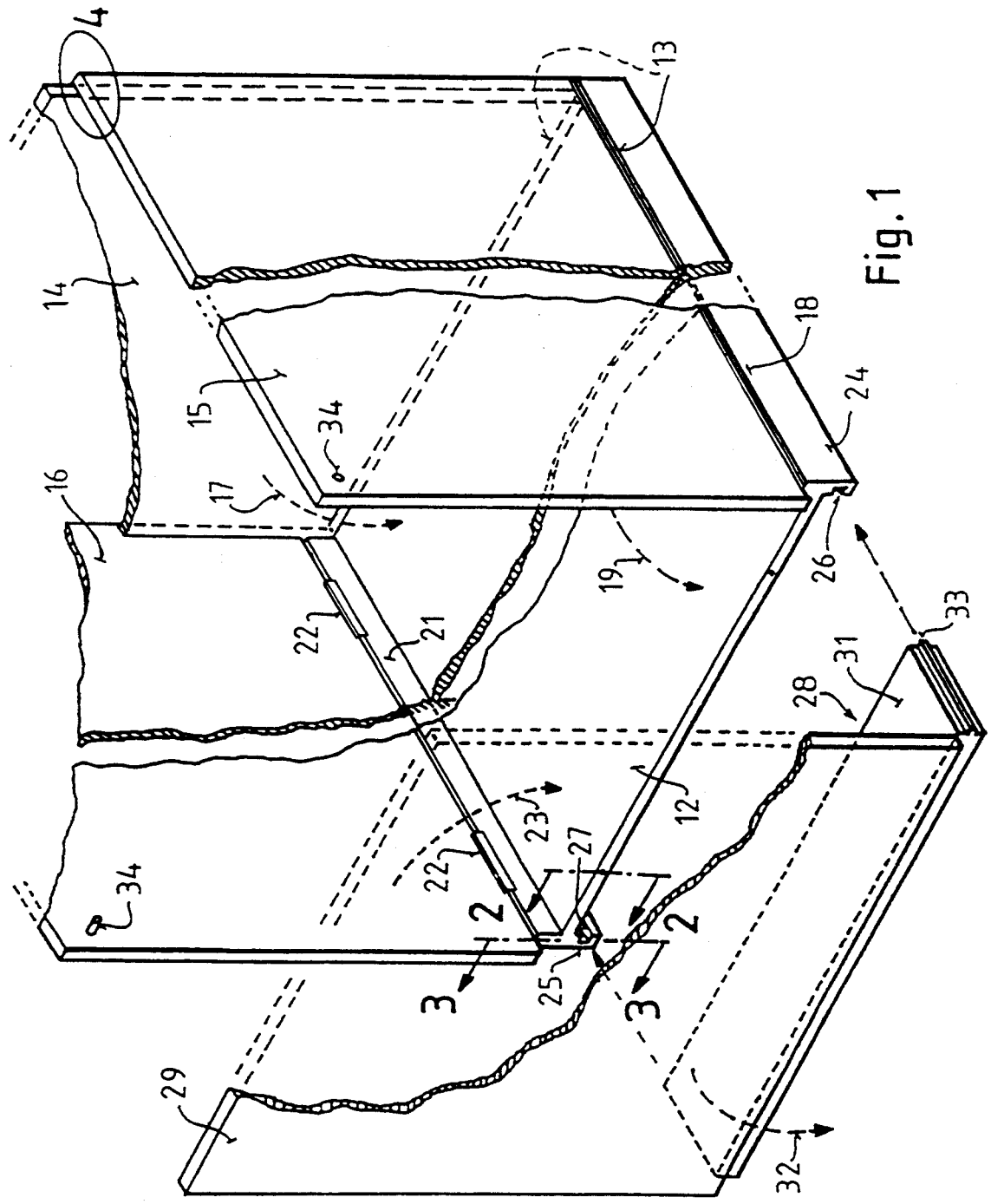

United States Patent [19]

Sinz

[11] Patent Number: 5,341,950
[45] Date of Patent: Aug. 30, 1994

[54] TRANSPORT CONTAINER

[76] Inventor: Dirk-Peter Sinz, Kaiser-Friedrich-Promenade-155, 6380 Bad Hamburg, Fed. Rep. of Germany

[21] Appl. No.: 15,210
[22] Filed: Feb. 9, 1993
[30] Foreign Application Priority Data
Feb. 14, 1992 [DE] Fed. Rep. of Germany ....... 4204397
[51] Int. Cl.5 .............................................. B65D 7/24
[52] U.S. Cl. .......................................... 220/6; 220/1.5
[58] Field of Search ............................ 220/4.28, 6, 1.5
[56] References Cited
U.S. PATENT DOCUMENTS 2,221,504  11/1940  Beasley et al. ............................ 220/6
3,195,506   7/1965  Beard .................................... 220/6 X
3,812,999   5/1974  Joseph .................................... 220/6 X
4,646,928   3/1987  Ono et al. ............................ 220/1.5 X
4,662,532   5/1987  Anderson et al. ..................... 220/1.5 X
4,674,645   6/1987  Instone et al. .......................... 220/1.5
4,693,386   9/1987  Hughes et al. ......................... 220/6 X
4,735,331   4/1988  Keenan et al. ....................... 220/1.5 X Primary Examiner—Steven M. Pollard

[57] ABSTRACT

A transport container has three wall panels (14, 15, 16) which can be folded in one above another in layers, and also a fourth wall panel (29) mounted on a slide member (28). This fourth wall panel (29) can, when required, be stowed beneath the base panel (12) in order to make possible unhindered access into the container from the front side.

The container can be stored, with a saving of space, in the folded-up state.

41 Claims, 6 Drawing Sheets

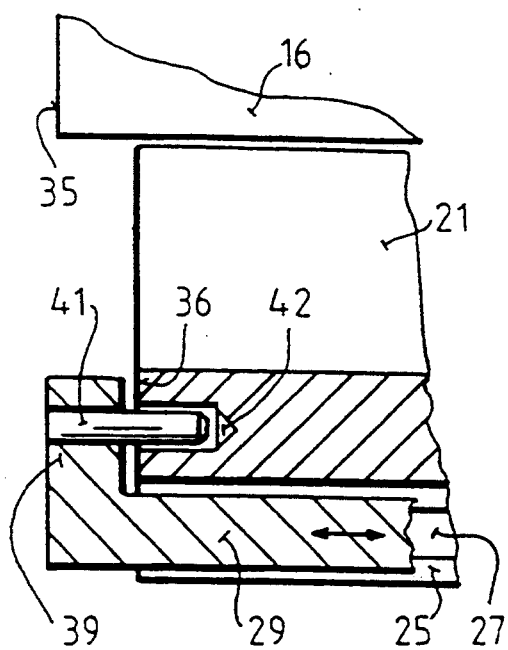
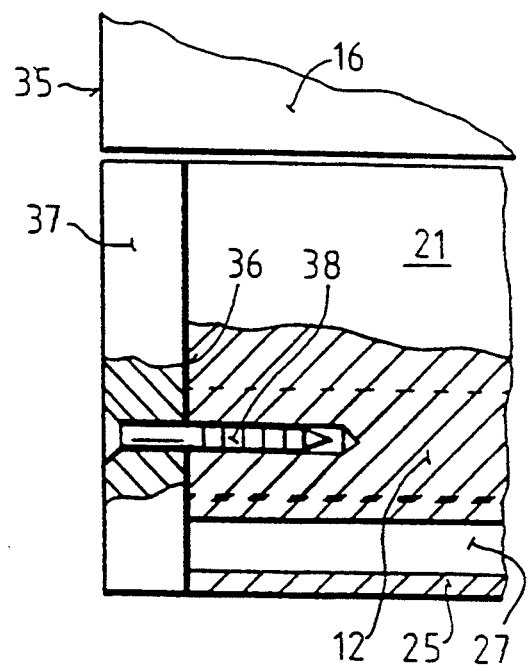
Fig.2
Fig.3
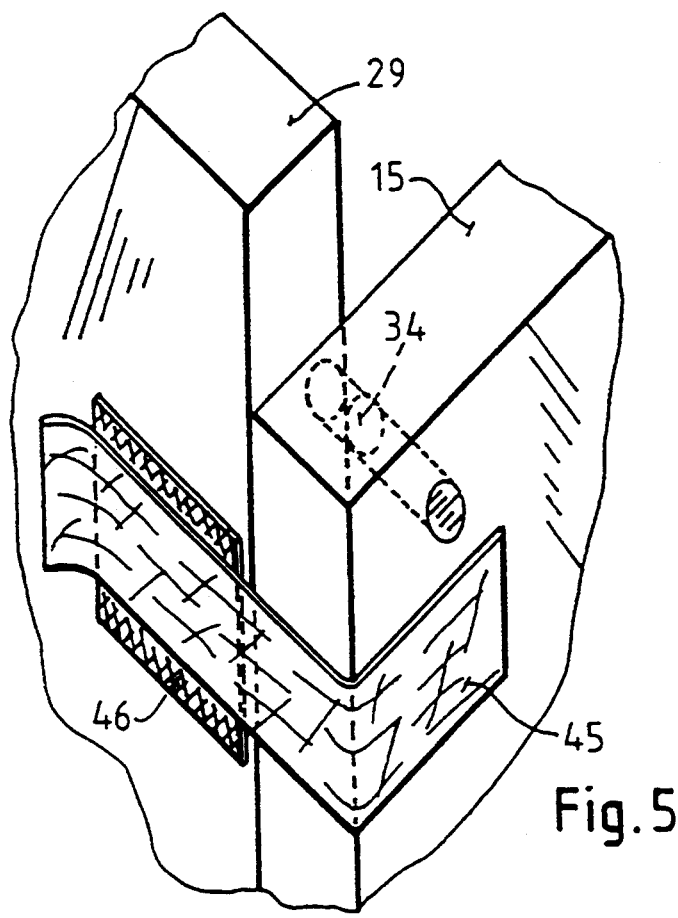
Fig.5
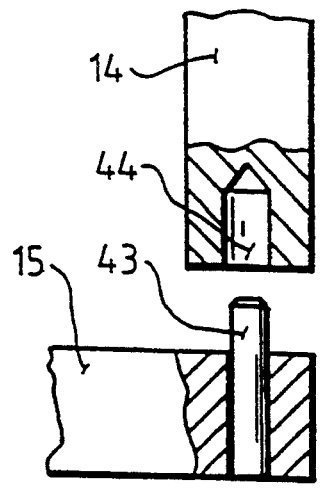
Fig.4

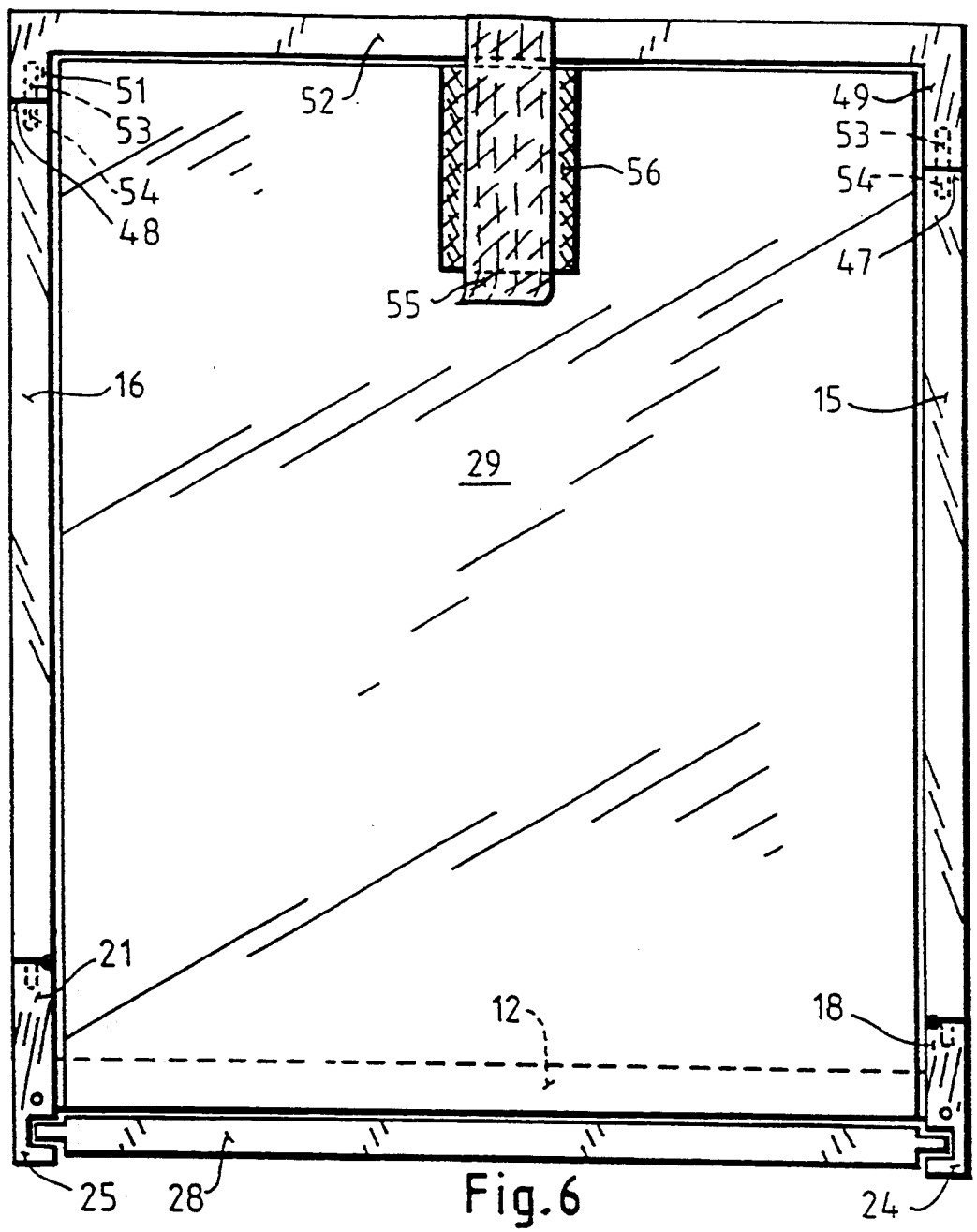
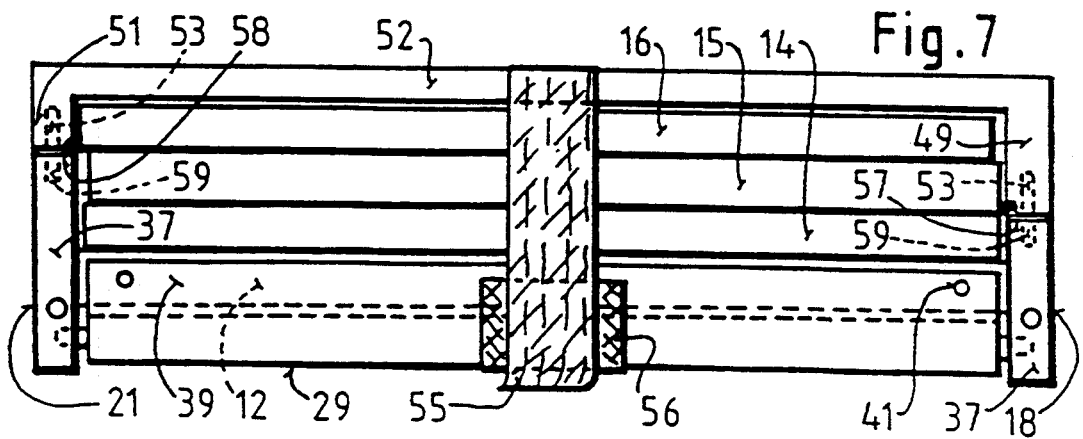
Fig. 6
Fig. 7

TRANSPORT CONTAINER

The invention relates to a transport container of the kind indicated in the preamble of claim 1.

A transport container of this kind is described in German Utility Model 8536127. A returnable container for multiple use is concerned there, as a substitute for a single-use container of corrugated cardboard. A manufacturer's goods are transported in the transport container, for example to a dealer, stored there in the meantime, and taken out of the transport container as required. The now empty transport container is then folded up and stored, with a saving of space. When several empty transport containers have been collected in this manner, they are sent back to the manufacturer of the goods and thus placed in circulation again.

The possibility of folding up the transport containers in a space-saving fashion is thus decisive for their reusability; and the unfolding and folding up must take place easily. Sufficient stability is of course also required.

A transport container always has four wall panels, and in the state of the art of this kind, the fourth wall panel, opposite the first wall panel, is likewise folded in directly onto the base panel. Because of this, the length of the base panel must correspond to at least twice the height of the container. This limits the adaptation of the form of the container to storage and transport conditions. A further disadvantage is that the container volume is only accessible from above.

The object of the invention is to provide a transport container of the abovementioned kind, which makes possible greater latitude as regards the container form, and a more practical utilization. This object is achieved by the characterizing features of claim 1.

In contrast to the prior art, the fourth wall panel is accordingly pivoted away from the container and can then be pushed under the base panel. There is then unhindered access from the side to the container volume. This is especially of advantage in commission agents' warehouses, if several containers with respectively different goods are stacked one above the other, and goods are to be taken from each container in order to put together an assortment of goods, for example, for further delivery to a business branch. The length of the base panel needs to correspond only to the height of the fourth wall plus the length of the slide member, and can thus be shorter than that of the prior art.

If according to claim 17 a cover panel is also provided, a transport container is obtained which can be closed on all sides, and the cover panel does not necessarily have to be removed for loading and unloading, because of the fourth wall panel which can be pivoted away.

The further developments according to claims 25 and 29 establish the possibility of producing different forms of container in a cost-effective and very easily realized manner.

Further advantageous embodiments and developments are given by the remaining dependent claims, and also from the following description of embodiment examples of the invention with reference to the drawing.

Figure 8:
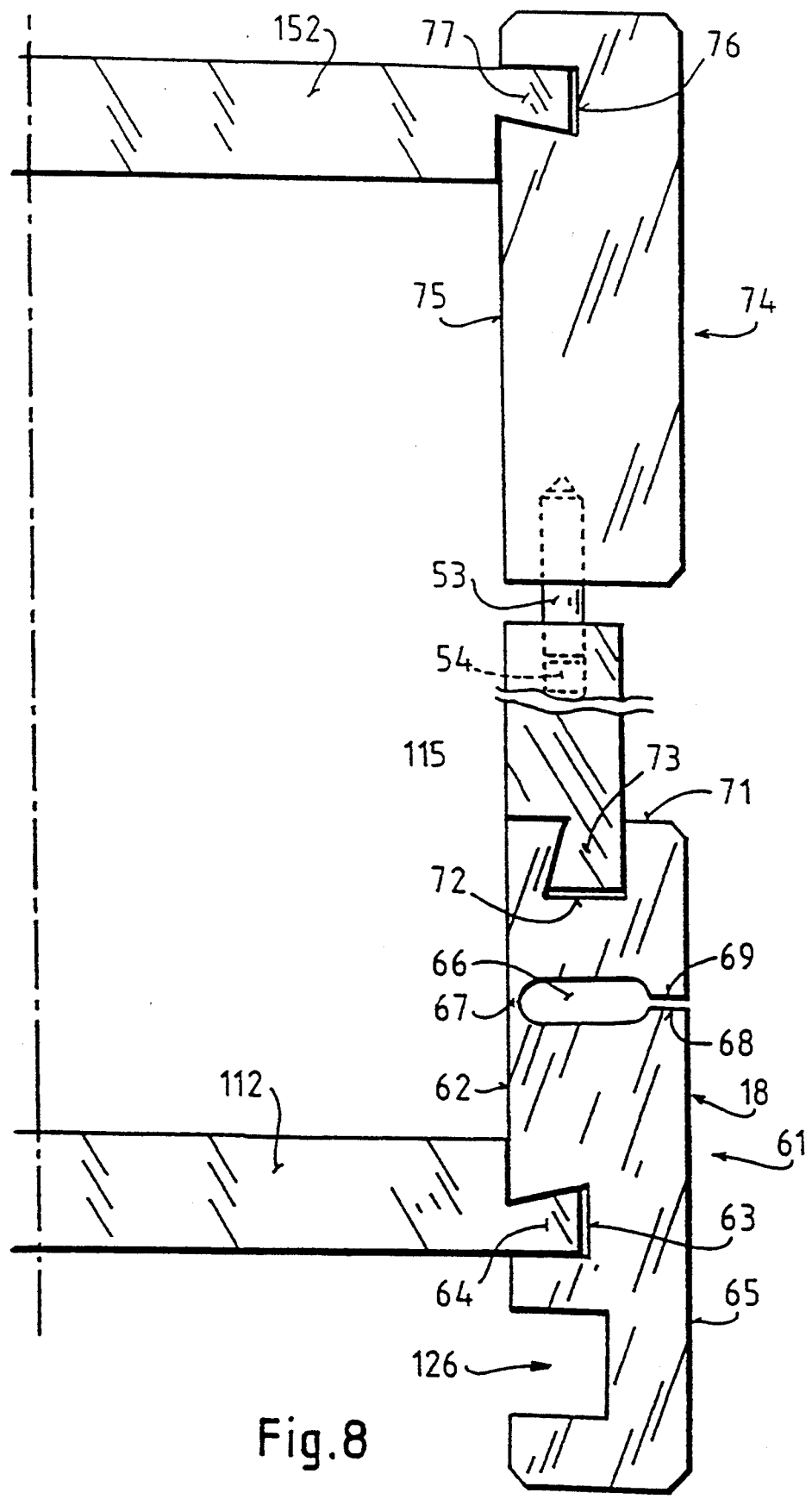
Figure 9:
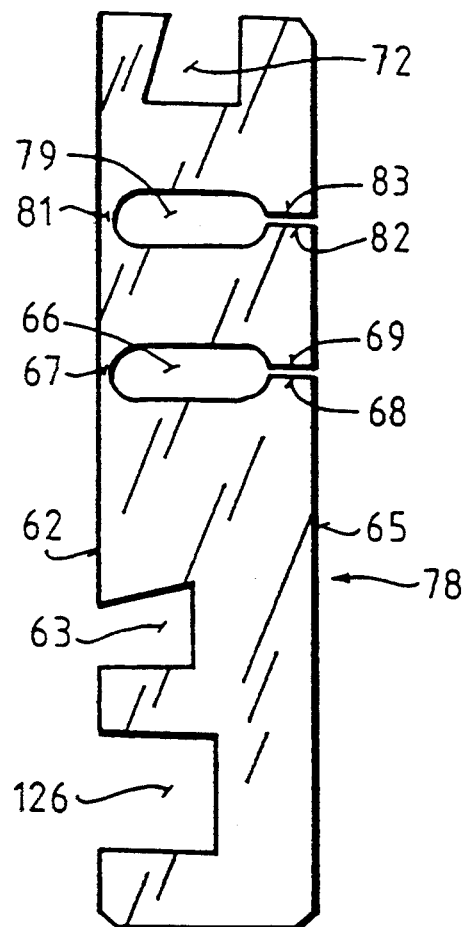
Figure 10:
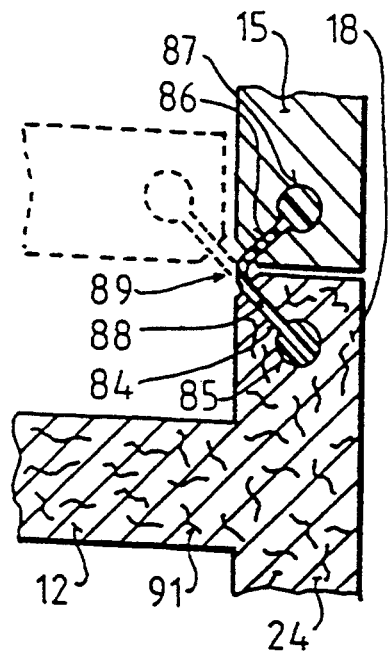
Figure 11:
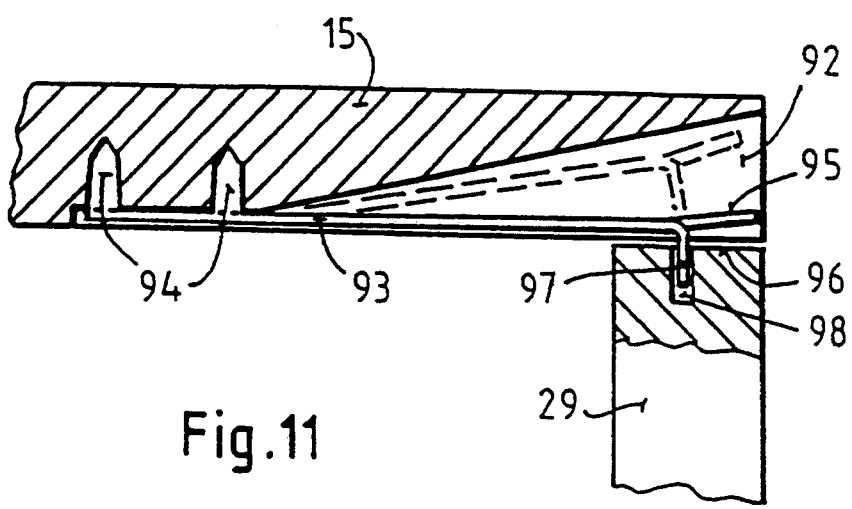
Figure 12:
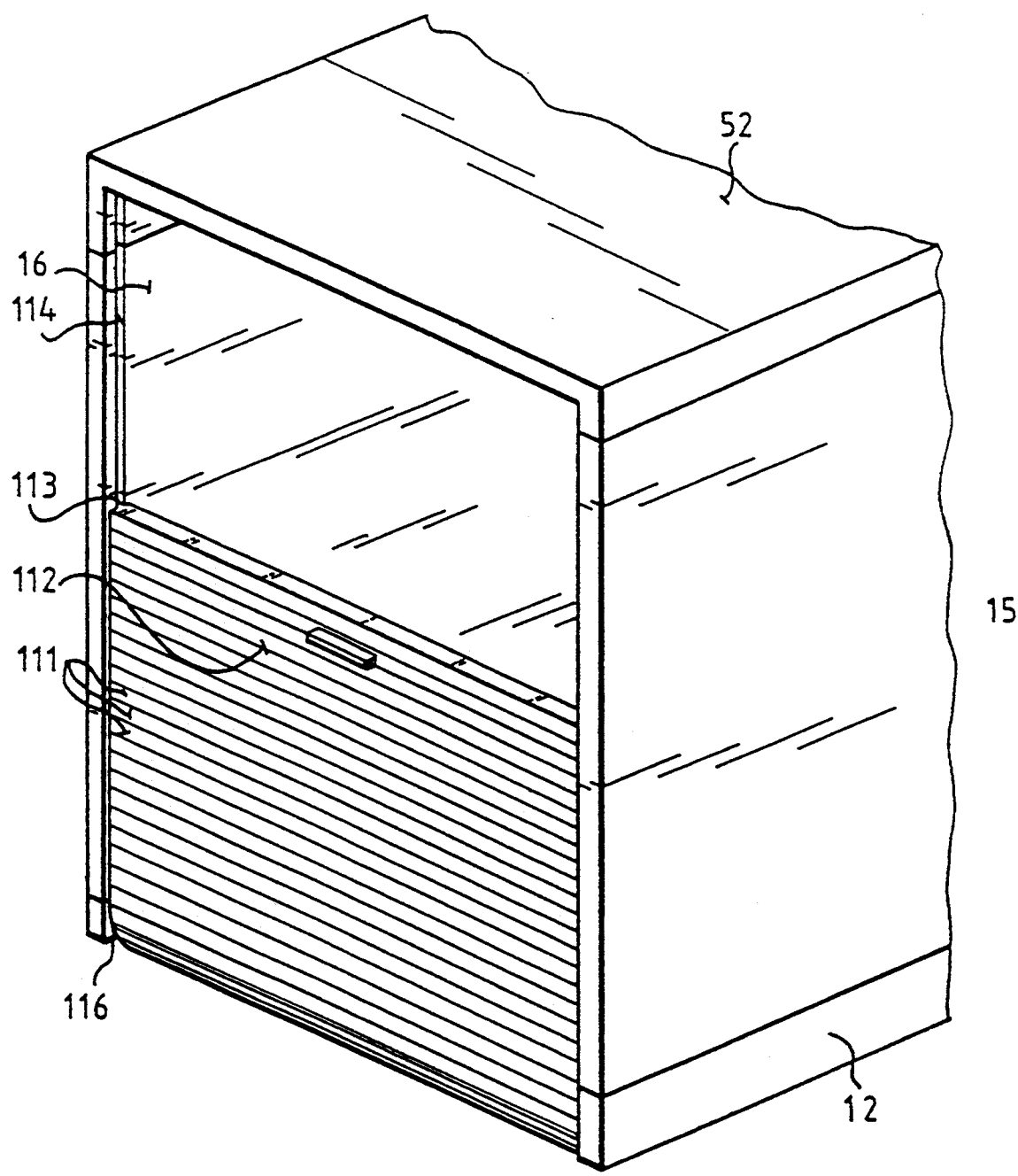

FIG. 1 shows a schematic representation of a transport container according to the invention, FIG. 2 shows a detail section of a hook device in the plane 2—2 of FIG. 1, FIG. 3 shows a detail section in the end region of a guide rail in the plane 3—3 of FIG. 1, FIG. 4 shows a detail section of the region 4 of FIG. 1, FIG. 5 shows a detail view with a blocking element, FIG. 6 shows a front view of a transport container with the cover panel in the unfolded state, FIG. 7 shows a front view of the transport container of FIG. 6 in the folded-up state, FIG. 8 shows a front view of a transport container according to a preferred embodiment of the invention, shown without the first and fourth wall panels, FIG. 9 shows an extruded profile adapted to the embodiment according to FIG. 8, FIG. 10 shows a detail representation of a hinge structure, FIG. 11 shows a detail section of a further blocking element, and FIG. 12 shows a perspective representation of a further embodiment example.

The transport container according to FIG. 1 includes a base panel 12 with four peripheral edges 13, a first wall panel 14, a second wall panel 15, and opposite this a third wall panel 16. The first wall panel 14 is mounted (in a known manner) on the base panel 12 by means of joints or hinges (not shown), so that it can be folded in, in the direction of the arrow 17, from the operating position shown into an inoperative position lying on the base panel 12. The hinges can be constructed, for example, as shown in German Utility Model 8536127. The second wall panel 15 is mounted, to be pivotable in the direction of the arrow 19, on a first mounting shoulder 18 of the base panel 12, the mounting shoulder 18 having the effect that the hinge axis lies above the base panel 12 to an extent such that the second wall panel 15 can lie on, and parallel to, the folded-in first wall panel 14. The third wall panel 16, finally, is pivotably mounted (hinges 22 are indicated schematically) on a still higher second mounting shoulder 21, such that it can be pivoted in the direction of the arrow 23 and then lies on, and parallel to, the folded-in second wall panel 15. In the operating position shown, the first wall panel stands perpendicularly between the second and third wall panels 15, 16 and thus blocks these two wall panels from pivoting in.

Guide rails 24 and 25 which project downwards from the base panel 12 are provided respectively beneath the mounting shoulders 18 and 21, and opposed guide channels 26 and 27 are formed in the said guide rails. A slide member 28 is displaceably mounted between the guide rails 24, 25, a fourth wall panel 29 being pivotably mounted on it. The slide member 28 consists of a bridge element 31 which bridges over the distance between the guide rails 24, 25, and in the simplest case consists of an elongate batten. The fourth wall panel 29 is hinged onto the longitudinal side of the bridge element 31 such that it can be pivoted in the direction of the arrow 32 into an intermediate position parallel to the base panel 12. It can then be pushed, guided by the slide member, into a stowage position beneath the base panel 12. Guide elements 33 on the two narrow sides of the bridge element 31 then slide in the guide channels 26, 27. The guide elements 33 are projecting webs in the exemplary case; they can also, however, each be formed by two pins which are anchored in the bridge element 31. The bridge element can be constructed as a frame construction with a rectangular or X-shaped beam arrangement, or the batten shown is given wide perforations to reduce its weight.

In the operating position, the fourth wall panel 29 stands perpendicularly between the second and third wall panels 15, 16. A stop element 34, approximately in the form of a pin, stands out from the inner side of the third wall panel 16 and prevents the fourth wall panel 29 from pivoting inwards. A corresponding stop element also stands out from the second wall panel 15, but is not visible in FIG. 1.

In FIGS. 2 and 3, there is seen a portion of the third wall panel 16 above the second mounting shoulder 21, the base panel 12 and the guide rail 25 with guide channel 27. It can be seen that the front edge 35 of the third wall panel 16 projects over the end face 36 of the base panel 12 by the wall thickness of the fourth wall panel 29.

According to FIG. 3, the corner region is filled by a locking member 37 which is fastened by means of a grooved stud 38. The locking member 37 is prismatic, is aligned inside and out with the second mounting shoulder 21, and occludes the guide channel 27 at the end. It prevents the slide member 28 being inadvertently pulled forward out of the guide. A similar locking member is also provided for the occlusion of the opposite guide channel 26 (FIG. 1). Since the first mounting shoulder 18 is lower there, the locking member is also correspondingly shorter.

The fourth wall panel 29 is shown in its stowage position in FIG. 2; the locking member lying behind it is however not shown, to give a better general view. A batten 39 projects in front of the end face 36 from the edge of the fourth wall panel 29. A pin 41 is anchored in the batten 39 and engages in a bore 42 in the end face 36. Thus the fourth wall panel 29 on the one hand can not be pushed further in, and on the other hand it cannot pivot away downwards as far as its hinging to the slide member would permit, or as far as could damage this hinge.

The arresting device according to FIG. 4 consists of a pin 43 standing out from the inner surface of the second wall panel 15 and engaging in a bore 44 in the narrow side of the first wall panel 14. An arresting device of the same kind is provided between the first wall panel 14 and the third wall panel 16. These arresting devices block the first wall panel 14 and are released by pivoting the second and third wall panels 15, 16 away from each other a little.

This pivoting away from each other is itself prevented by releasable blocking elements of different varieties. A kind of blocking takes place by a cover panel which is placed in position, as is further described below.

Another kind uses a hook tape closure, as is illustrated in FIG. 5. Here the stop element 34 is seen to stand out from the inner side of the second wall panel 15, with the fourth wall panel 29 abutting on it. An end of a hook tape 45 is fastened, for example adhered, to the outer face of the second wall panel 15; the loose end of the tape 45 reaches over the corner to the outer side of the fourth wall panel 29 and is releasably hooked there in a known manner to a loop tape 46 which is adhered there to the fourth wall panel 29. When several transport containers are stacked one above the other and adjacent to each other, the hook tape 45 can then be released unhindered from the front side, and the front fourth wall panel 29 can be unfolded towards the front.

However, strips of adhesive tape which pass over the corners can also be provided as blocking elements (at all corners), in the same way that cartons are sealed up. The strips of adhesive tape can be pulled away or cut through to release the blocking. Strips of such a kind can at the same time also function as a packaging seal.

FIG. 6 shows a transport container from the front. It will be recognized that the base panel 12 is indicated dashed, since it is covered by the fourth wall panel 29. To the sides of the base panel 12 are seen the mounting shoulders 24, 25 with the slide member 28 lying between them. The locking members 37 (FIG. 3) are not fitted here, in order not to cover the profile of the guide rails. Batten-like support elements 49, 51 lie on the upper end sides 47 and 48 of the second and third wall panels 15, 16, and stand out downwards from opposite peripheral edges of a cover panel 52. Several downward-projecting pins 53 are anchored in the support elements 49, 51, and engage in corresponding bores 54 in the upper end sides 47, 48, thus preventing the cover panel 52 from being displaced longitudinally. An outward pivoting of the wall panels 15, 16 is also thus prevented.

The cover panel 52 can be fixed by means of a hook tape 55 fastened to the upper side and hooked to a loop tape 56 adhered to the front side of the fourth wall panel 29. Lateral hook tapes (according to FIG. 5) can be additionally provided. They hold the walls together, even when the cover panel 52 is removed.

FIG. 7 shows the transport container from in front, in the folded-up state. The locking members 37 are shown here. The batten 39 (FIG. 2) on the fourth wall panel 29 largely covers the base panel 12, on which the first wall panel 14 lies, followed by the second and third wall panels 15, 16.

Since the hinge axes of the second and third wall panels 15, 16 are offset by the wall thickness, and the mounting shoulder 18 is therefore lower than the mounting shoulder 21, the support elements 49, 51 are also of different heights. According to FIG. 7, they abut on the upper end sides 57, 58 of the mounting shoulders 18, 21, with the cover panel 52 lying above, and parallel to, the upper wall panel 16. The pins 53 then engage in bores 59 in the end sides 57, 58 and secure the position of the cover panel 52. When the loop tape 58 also reaches over the region of the batten 39 and the hook tape 55 is long enough, the cover panel 52 can, with the same hook tape closure, be held fast in the indicated position. It will be understood that a similar hook tape closure is to be provided on the rear side.

Furthermore it is to be noted that the wall thicknesses of the wall panels and of the slide member are shown excessively large in FIGS. 6 and 7 in relation to the other dimensions of the transport container. Further bores in the plates lying one on another, into which bores the stop elements 34 and pins 43 can enter, are not shown.

FIG. 8 shows a front view of the right-hand side of a transport container in which extruded profiles are used. The slide member, the first and second wall panels, and the locking members are not shown here. The main components have the same reference number, but increased by 100, as in FIG. 1 or FIG. 6, in order to facilitate understanding.

A first extruded profile 61 has an approximately rectangular cross section. The guide channel 126 is formed in its first (inner) flat side 52, on the lower edge, and at a distance above it a first retaining channel 63 is molded in the form of a dovetail groove, into which the longitudinal edge, constructed as a complementary dovetail 64, of the base panel 112 is inserted. A first hinge channel 66 is molded in the second (outer) flat side 65, and extends as far as the vicinity of the first flat side 62, so that a first strap hinge 67 results at a spacing of approximately the wall thickness of the first wall panel over the base panel 112. The first hinge channel 66 is narrowed in the region of the second flat side 65 (to the extent permitted by the extrusion tool) in order to form opposed support surfaces 68, 69. A second retaining channel 72 in the form of a dovetail groove is molded in the upper narrow side 71. The longitudinal edge, formed as a complementary dovetail 73, of the second wall panel 115 is inserted into the said groove. To be exact, the portion of the extruded profile 61 which is situated above the first hinge channel 66 is to be considered as functionally a component of the second wall panel 115, while the portion situated below represents the mounting shoulder 18.

A second extruded profile 74 with a rectangular cross section has a retaining channel 76, likewise in the form of a dovetail groove, molded at the edge in its first (inner) flat side 75. The longitudinal edge of the cover panel 152, formed as a complementary dovetail 77, is inserted into the said groove.

The advantage of this construction is that the dimensions of the transport container can easily be adapted to the respective purpose of use. It is only necessary to machine panels of the desired width and length at their longitudinal edges with a profile milling cutter and to provide them with profile sections of fitting length. The profile sections are easily cut in the desired lengths. Altogether, four extruded profiles of different heights are required.

A reduction of the number of extruded profiles required is obtained with the extruded profile 78 shown in FIG. 9. It contains, as in the preceding example, a guide channel 126, a first retaining channel 63, a first hinge channel 66, and a second retaining channel 72. However, the portion above the first hinge channel 66 is higher, so that a second hinge channel 79 finds space for the formation of a second strap hinge 81 at the distance of the wall thickness of a wall panel above the first strap hinge 67. Also, the second hinge channel 79 tapers in the region of the second flat side 65 for the formation of opposed support surfaces 82, 83.

The same extruded profile can now be inserted at both longitudinal edges of the base panel, and only the strap hinge which does not fit needs to be blocked. The strap hinge 81 can, for example, be blocked in that adhesive is introduced between the support surfaces 82, 83. In this case, the extrusion profile 78 is used instead of the extrusion profile 61 of FIG. 8 for the mounting of the second wall panel 115. For the mounting of the third wall panel, the strap hinge 81 must remain movable, while the lower strap hinge 67 is blocked by the introduction of adhesive between the support surfaces 68, 69.

A respective adhesive tape can also be adhered over the gap opposite the strap hinges 67, 81.

In the embodiment according to FIG. 10, the base panel 12 (as also shown in FIG. 1) is constructed integrally with the mounting shoulders and guide rails, and can also be produced to this extent as an extruded profile of correspondingly width. In FIG. 10, only the mounting shoulder 18 is shown in which a retaining channel 84, open towards the inner edge, is molded with an internal widening 85. A mirror-image retaining channel 86 with an internal widening 87 is let into the lower longitudinal edge of the second wall panel 15. A strap hinge strip 88 is respectively anchored in the retaining channels 84, 86, and lies free over a short stretch in the plane of the inner surface of the second wall panel 15 and forms a hinge axis 89 there.

It goes without saying that other cross sectional shapes can be chosen for the retaining channels 63, 72, 84 and 86.

The components of the transport container, especially the supporting wall, base and cover parts, can be made of aluminum or plastic, and are preferably equipped with reinforcing ribs, which do not need to be separately shown here. A foamed thermoplastic plastic is recommended as the plastic, especially with a structure such that the air bubbles in the center are larger and/or more closely distributed than in the regions adjacent to the surface. This affords optimum strength and lightness.

As indicated in FIG. 10, the plastic can also be treated with admixtures, such as glass fibers or shreds of aluminum foil, which increase the modulus of elasticity. The latter is particularly recommended for the extruded profiles, since the aluminum foil shreds have little adverse effect on the extrusion tool and also are less interfered with by it than are the stiffer glass fibers.

FIG. 11 shows a variant of a blocking element in the form of a locking bar. For example, a recess 92, widening obliquely towards the front side, is provided on the inside in the second wall panel 15. A locking bar 93 of spring steel has, bent up at one end, an anchoring claw 94 with which it is fixed in the wall panel 15. The front, free end 95 is slightly angled, so that a thin article (e.g., a coin) can be inserted into the gap between this end 95 and the narrow side 96 of the fourth wall panel 29, and the locking bar 93 can thus be bent to the side. A portion is bent down at a right angle a little behind this angled end 95, so that a locking pin 97 results. This engages in a bore 98 in the narrow side 96 of the fourth wall panel 29. A pivoting motion of the fourth wall panel 29 is thus blocked. The locking pin 97 can be brought out of engagement with the bore 98 by means of the article mentioned above, whereupon the fourth wall panel 29 can be pivoted out. It is of decisive importance that the locked state can be released from the front side.

In the embodiment example according to FIG. 12, the fourth wall panel is not integral. Instead, the fourth wall panel is here in the form of, so to speak, nearly infinitesimal wall panel units in the form of bars 111 of a roller-type shutter. These form a roller-type shutter 112. The roller shutter bars 111 have, at their ends, projections 113 which are guided in perpendicular grooves 114 which are provided in the wall panels 15, 16 and also partially in the cover panel 52. The grooves 114 are continued below in the base panel 12 as curves 116, so that the roller-type shutter 112 is continuously deflected when it is opened, roller shutter bar after roller shutter bar, from its vertical position into the horizontal.

I claim:

1. Transport container, including a base panel and wall panels pivotably mounted on its peripheral edges of the said base panel, such that the said wall panels can be folded in, parallel to the base panel, into an inoperative position in which a first wall panel lies directly on the base panel and a second wall panel lies between the first and a third wall panel, and with arresting devices on the wall panels, in order to mutually arrest these in their operative position, unfolded perpendicularly with respect to the base panel, characterized in that a fourth wall panel unit (29) is pivotably mounted on a slide member (28), which slide member is displaceably guided beneath and parallel to the base panel (12), such that the fourth wall panel unit (29) is pivotable out of its operating position folded up perpendicularly to the base panel into an intermediate position directed parallel to the base panel and is then displaceable in common with the slide member (28) into a stowage position lying beneath and parallel to the base panel (12).

2. Transport container according to claim 1, characterized in that guide rails (24, 25), each for the formation of a guide channel (26, 27), are provided on two parallel, opposed peripheral edges (13) on the underside of the base panel (12), and that the slide member (28) has guide elements (33) which can respectively be inserted into the opposed guide channels, and also has a bridge element (31) which spans the distance between the guide rails and which carries the guide elements and hinge elements for the articulation of the fourth wall panel (29).

3. Transport container according to claim 2, characterized in that the bridge element (31) is an elongate batten, the length of which is equal to the length of the fourth wall panel (29) and the clear distance between the guide rails (24, 25), the hinge elements being arranged on its longitudinal side and the guide elements (33) being arranged on its narrow sides.

4. Transport container according to claim 1, characterized in that the fourth wall panel (29) has a hook device (39, 41) on its edge opposite to the slide member (28), such that as soon as the fourth wall panel (29) has been pushed into the stowage position, the hook device comes into engagement with the base panel (12) in order to block a pivoting of the fourth wall panel.

5. Transport container according to claim 4, characterized in that the hook device includes a batten (39) which projects up in front of the free end face (36) of the base panel (12) and from which at least one pin (41) stands out and can be pushed into a bore (42) in the end face (36) or can be placed against the upper side of the base panel (12).

6. Transport container according to claim 1, characterized in that the second and third wall panels (15, 16) are pivotably mounted on mounting shoulders (18, 21) which are arranged at respectively opposite peripheral edges (13) of the base panel (12) and which stand up perpendicularly of its upper side.

7. Transport container according to claim 1, characterized in that the first wall panel (14), in the unfolded operating position, stands perpendicularly between the second and third wall panels (15, 16), such that a pivoting-in of the second and third wall panels (15, 16) towards each other is blocked.

8. Transport container according to claim 7, characterized in that the arresting devices (43, 44) between the first wall panel (14) and the respective second and third wall panels (15, 16) are constructed such that a pivoting of the first wall panel (14) is blocked by the second and third wall panels which abut against it, the blocking being releasable by a pivoting of the second and third wall panels (15, 16) away from each other.

9. Transport container according to claim 8, characterized in that releasable blocking elements are provided which prevent a pivoting away of the second and third wall panels (15, 16).

10. Transport container according to claim 9, characterized in that hook tape closures are provided as blocking elements, the hook tapes (45) of which reach from the outer surface of the first wall panel respectively to an outer surface of the adjacent wall panel.

11. Transport container according to claim 1, characterized in that the fourth wall panel (29), in the unfolded operating position, stands parallel to the first wall panel (14) and perpendicularly between the second and third wall panels (15, 16).

12. Transport container according to claim 11, characterized in that a respective stop element (34) standing out from the inner surface is provided on the second and third wall panels (15, 16), in order to block a pivoting-in of the fourth wall panel (29) past the operating position.

13. Transport container according to claim 8, characterized in that pins (43) are provided which stand out from the inner surfaces of the second and third wall panels (15, 16) and which engage in bores (44) on the narrow sides of the first wall panel (14), to form an arresting device.

14. Transport container according to claim 11, characterized in that a blocking element (45, 93) which is releasably fixable on the fourth wall panel (29) is respectively provided on the second and third wall panels (15, 16), in order to block a pivoting away of the fourth wall panel (29) out of the operating position in the direction of the intermediate position.

15. Transport container according to claim 14, characterized in that hook tape closures are provided as the blocking elements, and their hook tapes (45) reach from the second and third wall panels (15, 16) respectively to the outer surface of the fourth wall panel (29).

16. Transport container according to claim 9 or 15, characterized in that strips of adhesive tape are provided as the blocking elements.

17. Transport container according to claim 1 or 7 or 8, characterized in that a removable cover panel (52) is provided, arresting devices (53, 54) being respectively constructed between the cover panel and the second and third wall panels (15, 16) such that the wall panels (15, 16), unfolded into the operative position, are blocked against a further pivoting away from each other when the cover panel (52) is placed in position.

18. Transport container according to claim 6 or 17, characterized in that the cover panel (52) has support elements (49, 51) like battens, which stand out on opposite peripheral edges, which in the unfolded operating position of the second and third wall panels (15, 16) abut against their upper end sides (47, 48), and which in the folded-in inoperative position of the wall panels abut against the mounting shoulders (18, 21) projecting up from the base panel (12).

19. Transport container according to claim 18, characterized in that a second extruded profile (74) with an approximately rectangular cross section is provided, and has a retaining channel (76) molded on the edge side in its first flat side (75), and in that the cover panel (152) can be anchored with its longitudinal edge (77) in the retaining channel (76).

20. Transport container according to claim 19, characterized in that the retaining channel (63, 72, 76) is formed as a dovetail groove and the longitudinal edges (64, 73, 77) are formed as complementary dovetails.

21. Transport container according to claim 17 or 18, characterized in that pins (53) are provided which stand out perpendicularly with respect to the cover panel (52) from the support elements (49, 51), and which engage in bores (54) in the upper end sides (47, 48) of the second and third wall panels (15, 16) or of the mounting shoulders (18, 21), to form arresting devices.

22. Transport container according to claim 18 or 21, characterized in that releasable blocking elements (55, 56) are provided which prevent a lifting of the cover plate (52) from the second and third wall panels (15, 16) or from the mounting shoulders (18, 21).

23. Transport container according to claim 22, characterized in that hook tape closures are provided as the blocking elements, the hook tapes (55) of which are fixed to the cover panel (52).

24. Transport container according to claim 1 or 6, characterized in that the wall panels are articulated to the base panel (12) or to the mounting shoulders (18, 21) by means of strap hinges (67, 81, 88).

25. Transport container according to claim 24, characterized in that a strap hinge strip (88) is anchored in the panel bodies (18, 15) on both sides of the hinge axis (89), the hinge axis (89) being formed by the strap hinge strip running in the plane of the inner surfaces of the wall panels (15, 16).

26. Transport container according to claim 24, characterized in that the strap hinge (67, 81) is constructed integrally with the panel bodies lying on both sides of the hinge axis, the hinge axis being formed in the plane of the inner surfaces of the wall panels (15, 16).

27. Transport container according to claim 2 or 24, characterized in that a first extruded profile (61) with an approximately rectangular cross section is provided, and has, molded in its first flat side (62), a guide channel (126) on the edge side, and also a first retaining channel (63) at a spacing from the said guide channel, and has, molded in its second flat side (65), a first hinge channel (66) which extends, to form a first strap hinge (67), as far as the region of the first flat side (62), and has, molded in its narrow side (71), a second retaining channel (72), the first hinge channel (66) being arranged between the first and second retaining channels (63, 72).

28. Transport container according to claim 27, characterized in that a second hinge channel (79) is formed in the second flat side (65) in the distance between the first hinge channel (66) and the second retaining channel (72), for the formation of a second strap hinge (81).

29. Transport container according to claim 27, characterized in that the base panel (112) can be anchored with its longitudinal edge (64) in the first retaining channel (63).

30. Transport container according to claim 27, characterized in that the second or the third wall panel (115) can be anchored with its longitudinal edge (73) in the second retaining channel (72).

31. Transport container according to claim 2 or 6, characterized in that the base panel (12) with the guide rails (24, 25) facing towards the underside and the mounting shoulders (18, 21) facing towards the upper side is produced in one piece.

32. Transport container according to claim 31, characterized in that the base panel (12) with guide rails (24, 25) and mounting shoulders (18, 21) is produced as an extruded profile.

33. Transport container according to any one of claims 1-32, characterized in that a plastic is provided as the material.

34. Transport container according to claim 33, characterized in that a foamed thermoplastic plastic is provided as the material, having its structure varied over the thickness of the material so that the included air bubbles are larger and/or more closely distributed in the center than in the regions near the surface.

35. Transport container according to claim 33, characterized in that the plastic is treated with admixtures which increase the modulus of elasticity.

36. Transport container according to claim 33, characterized in that shreds of aluminum foil (91) are mixed into the plastic.

37. Transport container according to claim 1, characterized in that the fourth wall panel unit (29) is at least essentially integral.

38. Transport container according to claim 1, characterized in that the fourth wall panel unit (29) has at least essentially the form of a roller-type shutter (112).

39. Transport container according to claim 38, characterized in that the roller-type shutter is guided at its two edges ( ) in a guide device (113) of at least the second and third wall panels (15, 16).

40. Transport container according to claim 39, characterized in that each guide device includes a groove (114).

41. Transport container according to claim 38, characterized in that the roller-type shutter (112) has a curve (116) in the guide device in the region of the transition to the base panel.

* * * * *